W. H. DOUGLAS.
ELECTRIC DRIVING GEAR FOR MOTOR VEHICLES.
APPLICATION FILED MAY 18, 1910.
1,041,449.
Patented Oct. 15, 1912.
2 SHEETS—SHEET 1.
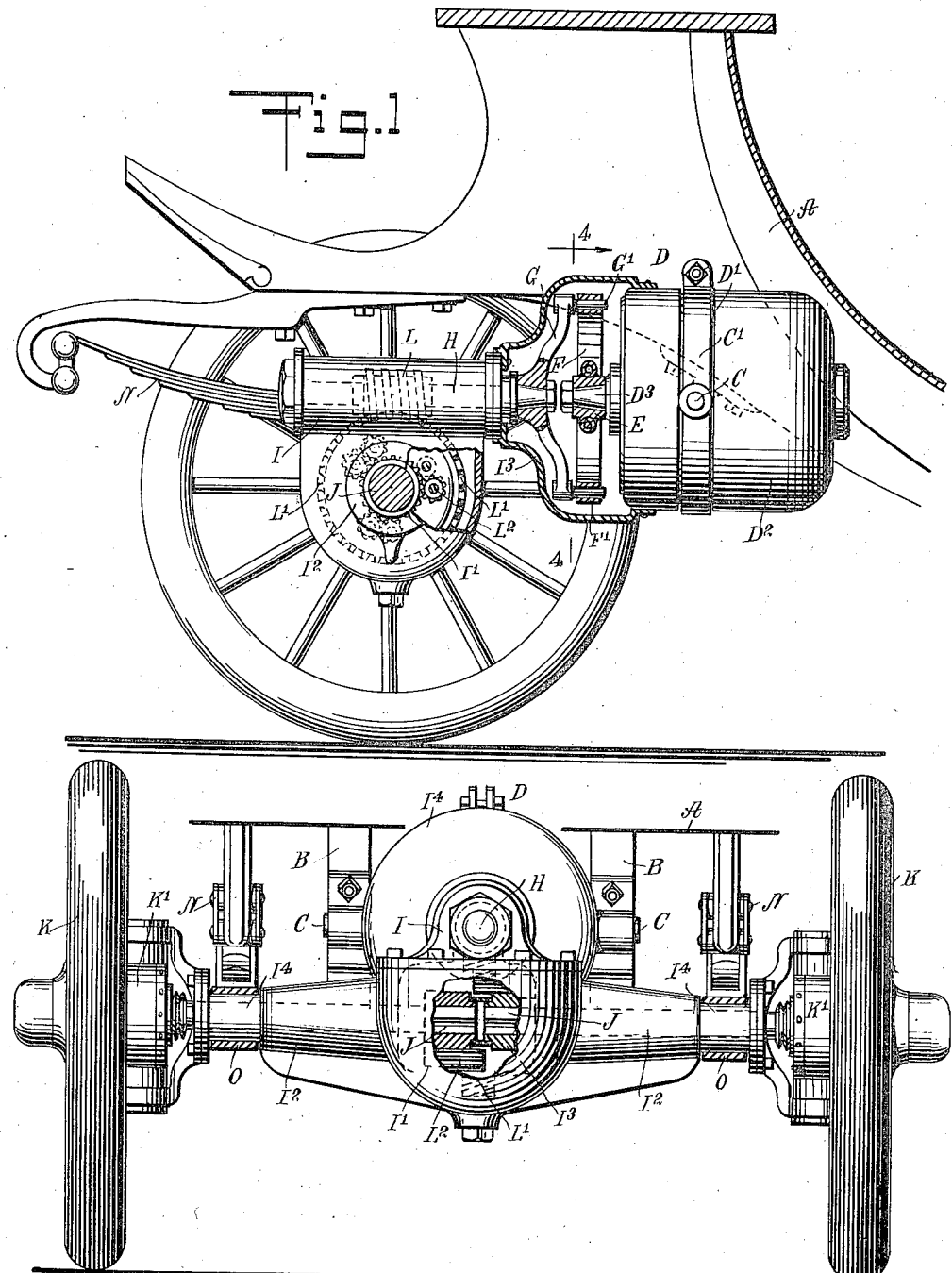
WITNESSES:
INVENTOR
William H. Douglas
BY
ATTORNEYS

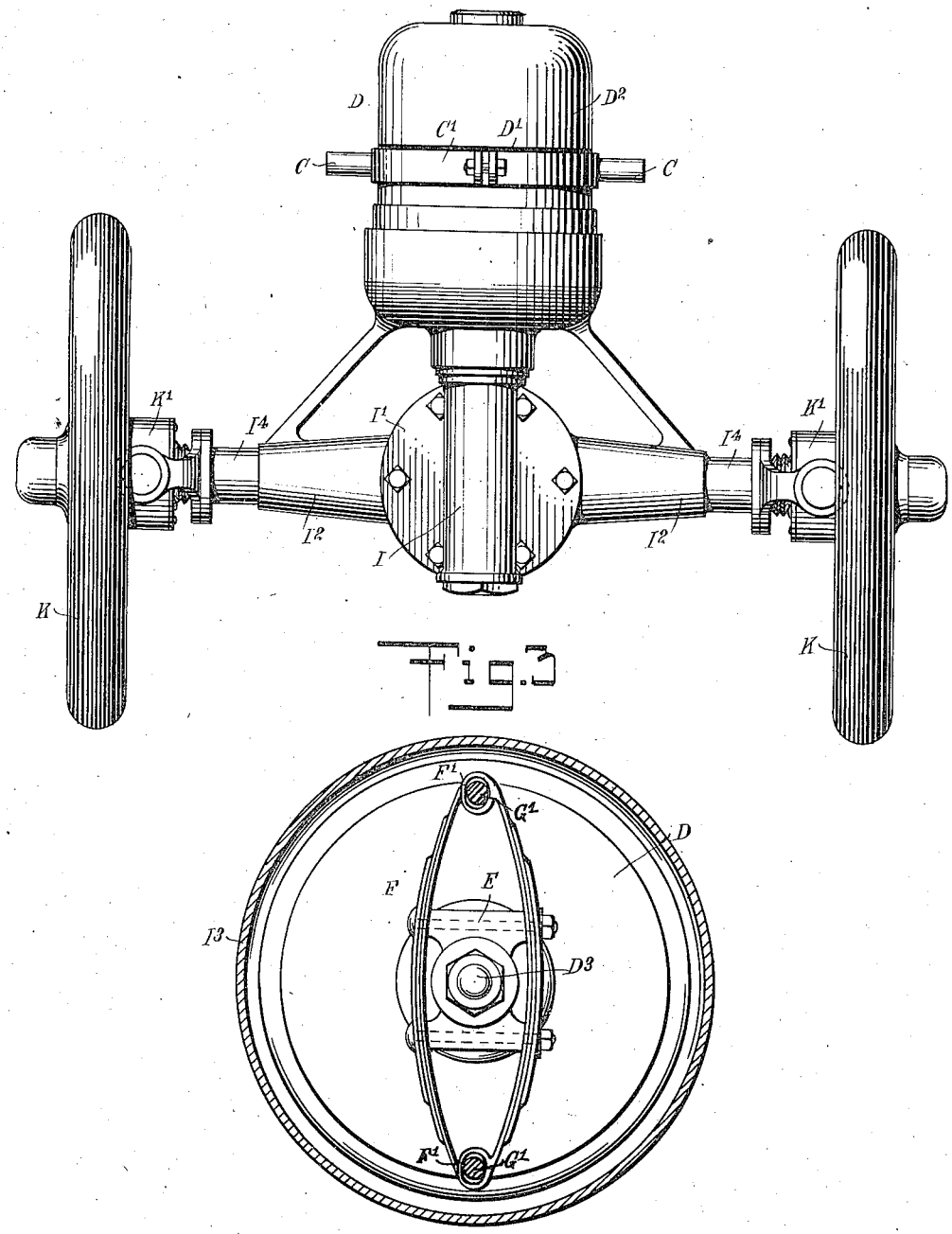

UNITED STATES PATENT OFFICE.

WILLIAM HENRY DOUGLAS, OF BELLEVILLE, NEW JERSEY, ASSIGNOR TO HEALEY & CO., OF NEW YORK, N. Y.

ELECTRIC DRIVING-GEAR FOR MOTOR-VEHICLES.

1,041,449.   Specification of Letters Patent.   Patented Oct. 15, 1912.

Application filed May 18, 1910. Serial No. 561,982.

*To all whom it may concern:*

Be it known that I, WILLIAM H. DOUGLAS, a citizen of the United States, and a resident of Belleville, in the county of Essex and State of New Jersey, have invented a new and Improved Electric Driving-Gear for Motor-Vehicles, of which the following is a full, clear, and exact description.

The invention relates to electrically-driven vehicles, and its object is to provide a new and improved electric motor drive for automobiles and other vehicles, and arranged to insure proper transmission of the power from the motor to the axle to counterbalance the motor and driven parts, and to allow the motor to oscillate in any direction, thus compensating for jolts and twists incident to running the vehicle over rough roads.

For the purpose mentioned, the motor shaft and the driven shaft connected with the axle are flexibly connected with each other, and the motor is suspended from the vehicle body in such a manner that it can oscillate in any direction.

A practical embodiment of the invention is represented in the accompanying drawings forming a part of this specification, in which similar characters of reference indicate corresponding parts in all the views.

Figure 1 is a side elevation of the electric motor drive as applied to a vehicle, parts being in section; Fig. 2 is a front elevation of the same, parts being in section; Fig. 3 is a plan view of the same, the vehicle body being omitted; and Fig. 4 is an enlarged cross section of the same on the line 4—4 of Fig. 1.

The vehicle body A is provided with the depending bearings B, in which are journaled the trunnions C of a ring-shaped suspension C', engaging an annular groove D' formed exteriorly in the casing $D^2$ of an electric motor D, of any approved construction, and having its shaft $D^3$ extending lengthwise of the vehicle, preferably at the center thereof, as plainly indicated in the drawings. Now by the arrangement described, the motor D is mounted to turn in the suspension C', which latter is capable of rocking on an axis extending transversely to the axis of the shaft $D^3$ of the motor D.

On the forward end of the motor shaft $D^3$ is secured a block E, bolted or otherwise fastened to the middle of a double elliptical spring F, having its ends terminating in eyes F', engaging pins G' projecting from an arm G, secured on the rear end of a shaft H in axial alinement with the motor shaft $D^3$, and mounted to turn in a bearing I attached to a casing I' having transversely-extending hollow arms $I^2$ for the passage of the axle J, made in main sections, connected by universal joints with the stub axles of the wheels K to be driven from the motor D. The stub axles are journaled in knuckles K', mounted to turn on the terminals of the hollow arms $I^2$, and this particular construction forms the subject matter of a separate application bearing the Serial No. 568,142, for a driving and steering mechanism for motor vehicles, filed by me under even date herewith, so that further description of the same in this specification is not deemed necessary.

On the shaft H is secured a worm L in mesh with a worm wheel L', secured to or forming part of a differential gearing $L^2$, contained in the casing I' and connected with the sections of the axle J, so as to drive the same at the same or at different speeds whenever the vehicle deviates from a straight path and turns to one side. Now by the arrangement described, the rotary motion given to the motor shaft $D^3$ is transmitted by the spring F to the arm G, which in turn rotates the shaft H, and the latter by the worm L and the worm wheel L' imparts a motion to the differential gearing $L^2$, so that the axles J are driven and with the same the wheels K, to propel the vehicle.

The bearing I is connected by a casing $I^3$ with the motor casing $D^2$, so as to inclose the flexible connection between the shafts $D^3$ and H, and by connecting the bearing I with the motor casing $D^2$, the casing I' is free to rock up and down with the motor D, turning on the trunnions C, and the vehicle body A and the motor D are free to rock transversely one relatively to the other, so that all twists or jolts do not affect the proper transmission of power from the motor to the wheels K.

By having the flexible connection consisting of the double elliptical spring F, the motor shaft $D^3$ and the worm shaft H, the rigidity between the parts is broken, and consequently on starting the motor, the spring F is gradually placed under tension, to finally turn the shaft H and thus start the vehicle without sudden shocks or jars.

On stopping the motor the vehicle comes gradually to a standstill, as the spring F returns to normal position after the momentum of the vehicle is spent.

The vehicle body A is connected by the usual springs N with bearings O held on the reduced portions I⁴ of the arms I², to properly sustain the vehicle body from the axle, as will be readily understood by reference to Figs. 1 and 2.

Having thus described my invention, I claim as new and desire to secure by Letters Patent:

A driving connection for vehicles, comprising in combination with the body and the axle, of a motor, a suspension mounted to rock on the vehicle body, on an axis parallel with the axle, and in which the motor is mounted in a direction transverse to its axis, a bearing mounted to rock on the axle and attached to the casing of the motor, a shaft journaled in the bearing and having a driving connection with the motor and with the axle, said suspension being ring-shaped and provided with oppositely arranged trunnions, the motor casing having an annular groove in which the suspension is received, the body having depending bearings for the trunnions.

In testimony whereof I have signed my name to this specification in the presence of two subscribing witnesses.

WILLIAM HENRY DOUGLAS.

Witnesses:
F. A. HOSTER,
PHILIP D. ROLLHAUS.